United States Patent [19]

Ito

[11] Patent Number: 5,694,447
[45] Date of Patent: Dec. 2, 1997

[54] ENERGY SUBTRACTION PROCESSING METHOD AND APPARATUS

[75] Inventor: Wataru Ito, Kanagawa-ken, Japan

[73] Assignee: Fuji Photo Film Co., Ltd., Kanagawa, Japan

[21] Appl. No.: 686,516

[22] Filed: Jul. 26, 1996

[30] Foreign Application Priority Data

Jul. 27, 1995 [JP] Japan .................................. 7-191524

[51] Int. Cl.$^6$ .................................................. G01N 23/04
[52] U.S. Cl. .................... 378/62; 378/98.11; 250/363.02
[58] Field of Search ............................... 378/98.12, 98.11, 378/62; 250/363.9, 363.02, 369

[56] References Cited

U.S. PATENT DOCUMENTS

| | | | |
|---|---|---|---|
| 5,049,748 | 9/1991 | Ito et al. | 250/327.2 |
| 5,210,415 | 5/1993 | Ito | 250/327.2 |
| 5,461,655 | 10/1995 | Vuylsteke et al. | 378/62 |

*Primary Examiner*—David P. Porta
*Assistant Examiner*—David Vernon Bruce
*Attorney, Agent, or Firm*—Sughrue, Mion, Zinn, Macpeak & Seas, PLLC

[57] ABSTRACT

Frequency signals of a plurality of different frequency bands are obtained by transforming each of image signals into a multi-resolution space. Each image signal represents one of radiation images of a single object, which have been formed respectively with a plurality of kinds of radiation having different energy distributions and in which different images of at least part of the object are embedded. Signal components of the frequency signals, which are of an identical frequency band and correspond to different image signals, are weighted with weight factors, which are set in accordance with the frequency band, the signal components representing corresponding picture elements in frequency images represented by the frequency signals. The weighted signal components of the frequency signals are subtracted from one another. Difference signals are thus obtained for the plurality of the different frequency bands. An inverse transform is carried out on the difference signals, and an energy subtraction signal is thereby obtained.

10 Claims, 6 Drawing Sheets

| 0.0025 | 0.0125 | 0.02 | 0.0125 | 0.0025 |
|--------|--------|------|--------|--------|
| 0.0125 | 0.0625 | 0.1  | 0.0625 | 0.0125 |
| 0.02   | 0.1    | 0.16 | 0.1    | 0.02   |
| 0.0125 | 0.0625 | 0.1  | 0.0625 | 0.0125 |
| 0.0025 | 0.0125 | 0.02 | 0.0125 | 0.0025 |

ENERGY SUBTRACTION PROCESSING METHOD AND APPARATUS

BACKGROUND OF THE INVENTION

1. Field of the Invention

This invention relates to an energy subtraction processing method and apparatus, wherein a subtraction process is carried out on a plurality of image signals representing radiation images of a single object.

2. Description of the Prior Art

Techniques for obtaining an image signal, which represents an image, carrying out appropriate image processing on the image signal, and then reproducing a visible image by use of the processed image signal have heretofore been known in various fields. For example, in Japanese Unexamined Patent Publication No. 55(1980)-163772, the applicant proposed a method for carrying out frequency emphasis processing, such as unsharp mask processing, on an image signal, such that a visible radiation image may be obtained, which has good image quality and can serve as an effective tool in, particularly, the efficient and accurate diagnosis of an illness. With the frequency processing, an unsharp mask signal is subtracted from an image signal representing an original image, the resulting difference value is multiplied by an emphasis coefficient, and the thus obtained product is added to the image signal. In this manner, predetermined frequency components in the image are emphasized.

A different method for carrying out frequency processing on an image signal has also been proposed. With the proposed frequency processing method, an image is transformed into multi-resolution images by a Fourier transform, a wavelet transform, a sub-band transform, or the like, and the image signal representing the image is thereby decomposed into signals falling within a plurality of different frequency bands. Thereafter, of the decomposed signals, a signal falling within a desired frequency band is subjected to predetermined image processing, such as emphasis.

Further, recently, in the field of image processing, a novel technique for transforming an image into a multi-resolution space, which is referred to as the Laplacian pyramid technique, has been proposed in, for example, Japanese Unexamined Patent Publication No. 6(1994)-301766. With the proposed Laplacian pyramid technique, mask processing is carried out on the original image by using a mask having characteristics such that it may be approximately represented by a Gaussian function. A sub-sampling operation is then carried out on the resulting image in order to thin out the number of the picture elements to one half along each of two-dimensional directions of the array of the picture elements in the image, and an unsharp image having a size of one-fourth of the size of the original image is thereby obtained. Thereafter, a picture element having a value of 0 is inserted into each of the points on the unsharp image, which were eliminated during the sampling operation, and the image size is thereby restored to the original size. Mask processing is then carried out on the thus obtained image by using the aforesaid mask, and an unsharp image is thereby obtained. The thus obtained unsharp image is subtracted from the original image, and a detail image of a predetermined frequency band of the original image is thereby obtained. This processing is iterated with respect to the obtained unsharp image, and N number of unsharp images having sizes of $\frac{1}{2}^{2N}$ of the size of the original image are thereby formed. As described above, the sampling operation is carried out on the image, which has been obtained from the mask processing with the mask having characteristics such that it may be approximately represented by the Gaussian function. Therefore, though the Gaussian filter is used actually, the same processed image as that obtained when a Laplacian filter is used is obtained. Also, in this manner, the images of low frequency bands, which have the sizes of $\frac{1}{2}^{2N}$ of the size of the original image are successively obtained from the image of the original image size. Therefore, the group of the images obtained as a result of the processing is referred to as the Laplacian pyramid.

The Laplacian pyramid technique is described in detail in, for example, "Fast Filter Transforms for Image Processing" by Burt P. J., Computer Graphics and Image Processing, Vol. 16, pp. 20–51, 1981; "Fast Computation of the Difference of Low Pass Transform" by Growley J. L., Stern R. M., IEEE Trans. on Pattern Analysis and Machine Intelligence, Vol. 6, No. 2, March 1984; "A Theory for Multiresolution Signal Decomposition; The Wavelet Representation" by Mallat S. G., IEEE Trans. on Pattern Analysis and Machine Intelligence, Vol. 11, No. 7, July 1989; "Image Compression by Gabor Expansion" by Ebrahimi T., Kunt M., Optical Engineering, Vol. 30, No. 7, pp. 873–880, July 1991; and "Multiscale Image Contrast Amplification" by Pieter Vuylsteke, Emile Schoeters, SPIE, Vol. 2167, Image Processing (1994), pp. 551–560.

Japanese Unexamined Patent Publication No. 6(1994)-301766 mentioned above discloses a method, wherein processing for emphasizing image values is carried out on the images of all of the frequency bands in the Laplacian pyramid, which images have been obtained in the manner described above, and the image of each frequency band, which has been obtained from the emphasis processing, is then subjected to an inverse transform, and a processed image is thereby obtained. In the image obtained from such processing, the image has been emphasized in each frequency band. Therefore, an image is obtained such that unsharp mask processing might have been carried out substantially with masks having a plurality of sizes in the aforesaid unsharp mask processing.

Also, techniques for carrying out subtraction processing on radiation images have heretofore been known. When subtraction processing is to be carried out, a plurality of (basically, two) radiation images recorded under different conditions are photoelectrically read out, and digital image signals which represent the radiation images are thereby obtained. The image signal components of the digital image signals, which represent corresponding picture elements in the radiation images, are then subtracted from each other, and a difference signal is thereby obtained which represents the image of a specific structure or part of the object represented by the radiation images. With the subtraction processing method, the plurality of digital image signals are subtracted from each other in order to obtain a difference signal, and the radiation image of a specific structure can be reproduced from the difference signal.

Basically, subtraction processing is carried out with either the so-called temporal (time difference) subtraction processing method or the so-called energy subtraction processing method. In the former method, in order to extract the image of a specific structure of an object from the image of the entire object, the image signal representing a radiation image obtained without injection of contrast media is subtracted from the image signal representing a radiation image in which the image of the specific structure of the object is enhanced by the injection of contrast media. In the latter method, an object is exposed to several kinds of radiation having different energy distributions. Alternatively, the energy distribution of the radiation carrying image information of an object, is changed after it has been irradiated onto one of a plurality of radiation image recording media, after which the radiation impinges upon the second radiation image recording medium. In this manner, a plurality of radiation images, in which different images of a specific structure of the object are embedded, are obtained. Thereafter, the image signals representing the plurality of radiation images are weighted appropriately, when necessary, and subjected to a subtraction process, and the image of the specific structure of the object is thereby extracted.

Also, it has been proposed to use stimulable phosphors in radiation image recording and reproducing systems. Specifically, a sheet provided with a layer of the stimulable phosphor (hereinafter referred to as a stimulable phosphor sheet) is first exposed to radiation, which carries image information of an object, such as a human body. In this manner, a radiation image of the object is stored on the stimulable phosphor sheet. The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, when it is exposed to the stimulating rays, is photoelectrically detected and converted into an electric image signal. The electric image signal is then processed, and the processed image signal is then used during the reproduction of a visible image, which has good image quality and can serve as an effective tool in, particularly, the efficient and accurate diagnosis of an illness.

In the radiation image recording and reproducing systems wherein the stimulable phosphor sheets are utilized, the radiation images stored on the stimulable phosphor sheets are directly read out in the form of the electric image signals. Therefore, with the radiation image recording and reproducing systems, the subtraction processing described above can be carried out easily. Also, in cases where radiation images are recorded on sheets of X-ray photographic film, the radiation images can be read out from the X-ray photographic film by using a microphotometer, or the like, and image signals representing the radiation images can thereby be obtained. Therefore, in such cases, it is possible to carry out the subtraction processing described above.

In cases where energy subtraction processing is to be carried out by using the stimulable phosphor sheets, radiation images may be stored on, for example, two stimulable phosphor sheets such that the parts of the radiation images corresponding to a specific structure may be different in the two radiation images. For this purposes, two-shot energy subtraction processing may be employed wherein the operation for recording a radiation image is carried out twice with two kinds of radiation having different energy distributions. Alternatively, one-shot energy subtraction processing may be employed wherein, for example, two stimulable phosphor sheets placed one upon the other (they may be in contact with each other or spaced away from each other) are simultaneously exposed to radiation, which has passed through an object, such that they may be exposed to radiation having different energy distributions.

With the energy subtraction processing described above, only the image information representing the specific structure in the image can be extracted. However, in the aforesaid energy subtraction processing, when the difference signal is obtained, the weighting of the plurality of the image signals is carried out regardless of frequency of the images. Therefore, as a result of the subtraction processing, high frequency components, such as those of noise, in the images are emphasized. Accordingly, the image quality of the subtraction image, which is obtained from the subtraction processing, cannot be kept high, and a subtraction image which is perceptible cannot be obtained.

SUMMARY OF THE INVENTION

The primary object of the present invention is to provide an energy subtraction processing method, with which a subtraction image having good image quality is obtained.

Another object of the present invention is to provide an apparatus for carrying out the energy subtraction processing method.

The present invention provides an energy subtraction processing method, comprising the steps of:

i) obtaining frequency signals, each of which is of one of a plurality of different frequency bands and which have been obtained by transforming each of a plurality of image signals into a multi-resolution space, each of the plurality of the image signals representing one of a plurality of radiation images of a single object and being made up of a series of image signal components, the plurality of the radiation images of the single object having been formed respectively with a plurality of kinds of radiation having different energy distributions, different images of at least part of the object being embedded in the plurality of the radiation images, ii) weighting the signal components of the frequency signals, which are of an identical frequency band and correspond to different image signals among the plurality of the image signals, with weight factors, which are set in accordance with the frequency band, the signal components of the frequency signals representing corresponding picture elements in frequency images represented by the frequency signals, iii) subtracting the weighted signal components of the frequency signals from one another, which signal components represent corresponding picture elements in the frequency images represented by the frequency signals, a difference signal being thereby obtained for the identical frequency band, iv) carrying out the weighting and subtracting operations for each of the plurality of the different frequency bands, a plurality of difference signals being thereby obtained, and v) carrying out an inverse transform on the difference signals having been obtained for the plurality of the different frequency bands, an energy subtraction signal being thereby obtained.

The present invention also provides an energy subtraction processing apparatus, comprising:

i) a storage means for storing frequency signals, each of which is of one of a plurality of different frequency bands and which have been obtained by transforming each of a plurality of image signals into a multi-resolution space, each of the plurality of the image signals representing one of a plurality of radiation images of a single object and being made up of a series of image signal components, the plurality of the radiation images of the single object having been formed respectively with a plurality of kinds of radiation having different energy distributions, different images of at least part of the object being embedded in the plurality of the radiation images, ii) a subtraction processing means for weighting the signal components of the frequency signals, which are of an identical frequency band and correspond to different image signals among the plurality of the image signals, with weight factors, which are set in accordance with the frequency band, the signal components of the frequency signals representing corresponding picture elements in frequency images represented by the frequency signals, the subtraction processing means subtracting the weighted signal components of the frequency signals from one another, which signal components represent corresponding picture elements in the frequency images represented by the frequency signals, a difference signal being thereby obtained for the identical frequency band, the subtraction processing means carrying out the weighting and subtracting operations for each of the plurality of the different frequency bands, a plurality of difference signals being thereby obtained, and iii) an inverse transform means for carrying out an inverse transform on the difference signals having been obtained for the plurality of the different frequency bands, an energy subtraction signal being thereby obtained.

The term "transforming an image signal into a multi-resolution space" as used herein means decomposing the image signal into image signals representing the images of a plurality of different frequency bands by using a predetermined filter for the Laplacian pyramid technique, the wavelet transform, the sub-band transform, or the like.

In the energy subtraction processing method and apparatus in accordance with the present invention, the expression of "with a plurality of kinds of radiation having different energy distributions" does not necessarily mean a plurality of separate radiations but includes a plurality of kinds of radiations originated from a single radiation wherein, for example, one is a direct radiation from a radiation source, and the other is a radiation from the same radiation source, which has passed through a recording medium (e.g., a stimulable phosphor sheet) and/or a filter, or the like, and the low energy components of which have been filtered out. Therefore, the plurality of the radiation images can be formed one after another by using different radiations having different energy distributions. Alternatively, the plurality of the radiation images can be formed simultaneously by using a single radiation and placing a plurality of recording media (e.g., stimulable phosphor sheets) one upon another with or without a filter interposed therebetween. When the filter is not used, the stimulable phosphor sheet located closer to the radiation source serves as a filter for filtering out the low energy components of the radiation.

With the energy subtraction processing method and apparatus in accordance with the present invention, each of the plurality of the image signals, which are to be subjected to the energy subtraction processing, is transformed into the multi-resolution space and is thereby decomposed into the frequency signals, each of which is of one of a plurality of different frequency bands. When the difference signal representing the difference between the frequency signals, which are of an identical frequency band and correspond to different image signals among the plurality of the image signals, is obtained, the weight factors are altered in accordance with the frequency band of the frequency signals. For example, signals of comparatively high frequency bands contain much noise, and therefore the difference signal is obtained by setting the values of the weight factors such that noise may be reduced. In this manner, as for the frequency bands containing unnecessary frequency components, such as those representing noise, the weight factors can be set such that the unnecessary frequency components may become imperceptible. Therefore, with the energy subtraction signal obtained from the inverse transform of the difference signals of the respective frequency bands, a visible energy subtraction image can be reproduced, in which the unnecessary frequency components, such as those representing noise, are imperceptible and which has good image quality.

Also, the frequency signals of the plurality of the different frequency bands are obtained for various image processing, such as emphasis processing, and stored in a storage means. When the image processing is to be carried out on the frequency signals, they are read from the storage means and subjected to the image processing. With the energy subtraction processing method and apparatus in accordance with the present invention, the frequency signals having previously been stored in the storage means can be utilized. Therefore, particular operations need not necessarily be carried out in order to form new images, the time required to carry out the energy subtraction processing can be kept short, and the processing can be carried out quickly.

DESCRIPTION OF THE PREFERRED EMBODIMENTS

The present invention will hereinbelow be described in further detail with reference to the accompanying drawings.

Figure 1:
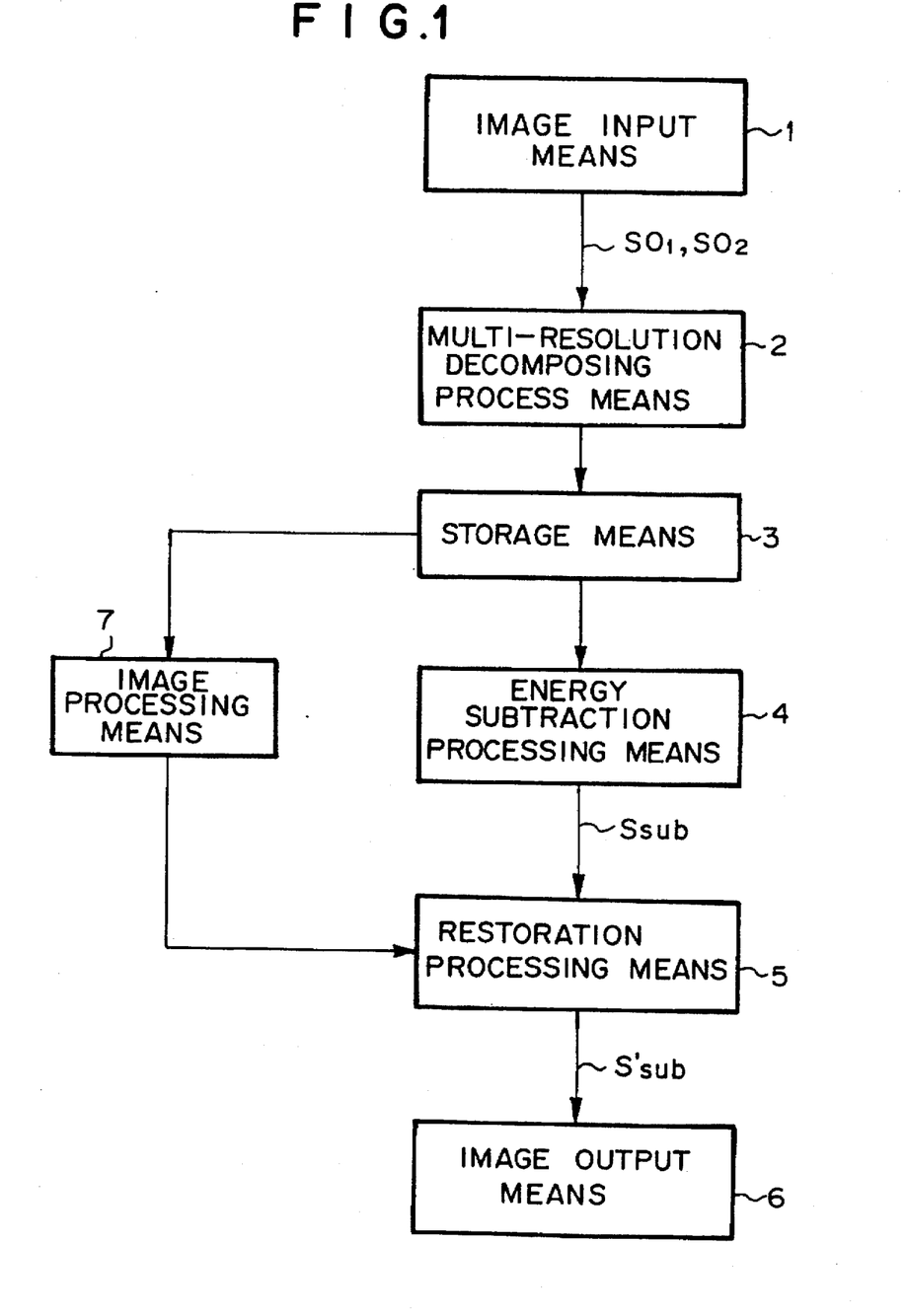
FIG. 1 is a block diagram showing an apparatus for carrying out an embodiment of the energy subtraction processing method in accordance with the present invention.

FIG. 1 is a block diagram showing an apparatus for carrying out an embodiment of the energy subtraction processing method in accordance with the present invention. As illustrated in FIG. 1, the apparatus for carrying out the embodiment of the energy subtraction processing method in accordance with the present invention comprises an image input means 1 for feeding image signals, which are to be subjected to the energy subtraction processing, into the apparatus, and a multi-resolution decomposing process means 2 for carrying out a multi-resolution decomposing process on each of the received image signals and thereby obtaining frequency signals of a plurality of different frequency bands. The apparatus also comprises a storage means 3 for storing the frequency signals having been decomposed into the plurality of the different frequency bands by the multi-resolution decomposing process means 2, and an energy subtraction processing means 4 for reading the frequency signals from the storage means 3 and carrying out the energy subtraction processing on the frequency signals. The apparatus further comprises a restoration processing means 5 for restoring difference signals Ssub, which have been obtained from the energy subtraction processing carried out by the energy subtraction processing means 4, and thereby obtaining an energy subtraction signal S'sub. The apparatus still further comprises an image output means 6 for reproducing a visible image from the energy subtraction signal S'sub, which has been restored by the restoration processing means 5. The apparatus also comprises an image processing means 7 for carrying out image processing, such as emphasis processing, on the frequency signals.

Figure 2:
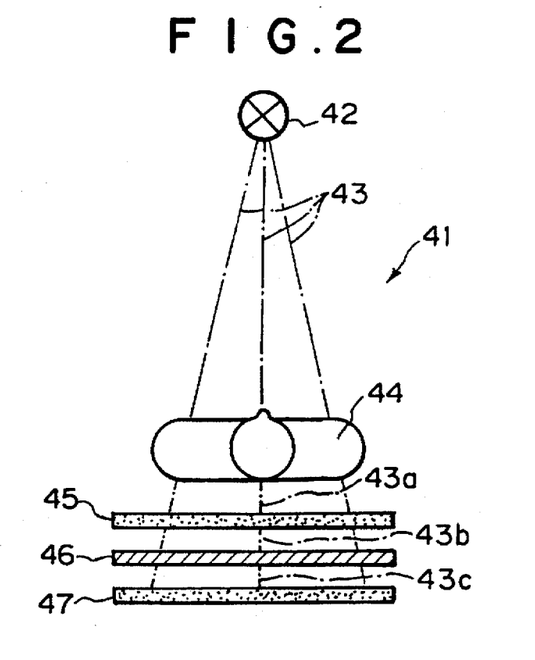
FIG. 2 is a schematic view showing an example of a radiation image recording apparatus.

FIG. 2 is a schematic view showing a radiation image recording apparatus 41 for obtaining image signals, which are to be subjected to the energy subtraction processing and are to be used in the embodiment of the energy subtraction processing method in accordance with the present invention.

A first stimulable phosphor sheet 45 is placed upon a second stimulable phosphor sheet 47 with a filter 46 intervening therebetween. An object 44 lies above the first stimulable phosphor sheet 45, and a radiation source 42 for producing radiation 43 is located above the object 44. The radiation image recording apparatus 41 is constituted in this manner.

The radiation 43, which has been produced by the radiation source 42, is irradiated to the object 44. Radiation 43a, which has passed through the object 44, impinge upon the first stimulable phosphor sheet 45, and part of energy from the radiation 43a is stored on the first stimulable phosphor sheet 45. In this manner, a radiation image of the object 44 is stored on the first stimulable phosphor sheet 45. (On the first stimulable phosphor sheet 45, the radiation image is recorded with the radiation having a high energy level.) Radiation 43b, which has passed through the first stimulable phosphor sheet 45, then passes through the filter 46. Radiation 43c, which has passed through the filter 46, impinges upon the second stimulable phosphor sheet 47. In this manner, a radiation image of the object 44 is stored on the second stimulable phosphor sheet 47. (On the second stimulable phosphor sheet 47, the radiation image is recorded with the radiation having a low energy level.)

Figure 3:
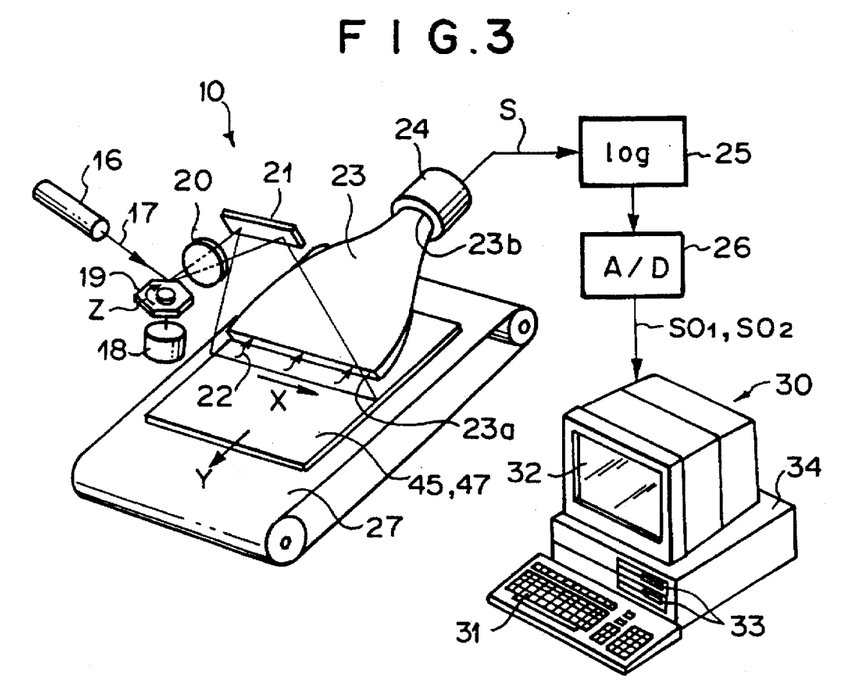
FIG. 3 is a perspective view showing an example of a radiation image read-out apparatus, and an image processing and displaying apparatus, which is provided with an apparatus for carrying out the embodiment of the energy subtraction processing method in accordance with the present invention.

FIG. 3 is a perspective view showing a radiation image read-out apparatus 10 for reading out a radiation image to be used in the embodiment of the energy subtraction processing method in accordance with the present invention, and an image processing and displaying apparatus 30, which is provided with an apparatus for carrying out the embodiment of the energy subtraction processing method in accordance with the present invention.

After the first radiation image and the second radiation image have been stored respectively on the first stimulable phosphor sheet 45 and the second stimulable phosphor sheet 47 in the radiation image recording apparatus 41 shown in FIG. 2, the first stimulable phosphor sheet 45 and the second stimulable phosphor sheet 47 are placed one after the other at a predetermined position in the radiation image read-out apparatus 10 shown in FIG. 3. How the first radiation image is read out from the first stimulable phosphor sheet 45 will be described hereinbelow.

With reference to FIG. 3, the first stimulable phosphor sheet 45 is conveyed in a sub-scanning direction indicated by the arrow Y by a sheet conveyance means 27, which is constituted of an endless belt, or the like, and which is operated by an operating means (not shown). A laser beam 17, which serves as stimulating rays, is produced by a laser beam source 16. The laser beam 17 is reflected and deflected by a rotating polygon mirror 19, which is being quickly rotated by a motor 18 in the direction indicated by the arrow Z. The laser beam 17 then passes through a converging lens 20, which may be constituted of an fθ lens, or the like. The direction of the optical path of the laser beam 17 is then changed by a mirror 21, and the laser beam 17 is caused to impinge upon the first stimulable phosphor sheet 45 and scan it in a main scanning direction indicated by the arrow X. The main scanning direction is approximately normal to the sub-scanning direction indicated by the arrow Y. When the first stimulable phosphor sheet 45 is exposed to the laser beam 17, the exposed portion of the first stimulable phosphor sheet 45 emits light 22 in an amount proportional to the amount of energy stored thereon during its exposure to the radiation. The emitted light 22 is guided by a light guide member 23, and photoelectrically detected by a photomultiplier 24. The light guide member 23 is made from a light guiding material, such as an acrylic plate. The light guide member 23 has a linear light input face 23a, positioned to extend along the main scanning line on the first stimulable phosphor sheet 45, and a ring-shaped light output face 23b, positioned so that it is in close contact with a light receiving face of the photomultiplier 24. The emitted light 22, which has entered the light guide member 23 from its light input face 23a, is guided through repeated total reflection inside of the light guide member 23, emanates from the light output face 23b, and is received by the photomultiplier 24. In this manner, the amount of the emitted light 22, which amount represents the first radiation image stored on the first stimulable phosphor sheet 45, is converted into an electric signal by the photomultiplier 24.

An analog signal S generated by the photomultiplier 24 is logarithmically amplified by a logarithmic amplifier 25, and fed into an analog-to-digital converter 26. The analog-to-digital converter 26 samples the analog signal S, and the sampled signal is converted into a digital image signal SO. The image signal SO thus obtained represents the first radiation image, which was stored on the first stimulable phosphor sheet 45, and will hereafter be referred to as the first image signal $SO_1$. The first image signal $SO_1$ is stored in a storage means of the image processing and displaying apparatus 30, which is provided with the apparatus for carrying out the embodiment of the energy subtraction processing method in accordance with the present invention.

The image processing and displaying apparatus 30 incorporates therein the energy subtraction processing apparatus in accordance with the present invention. The image processing and displaying apparatus 30 is provided with a keyboard 31, from which various instructions are entered, and a CRT display device 32, which displays auxiliary information for instructions and a visible image represented by an image signal. The image processing and displaying apparatus 30 is also provided with a floppy disk drive unit 33, which receives and operates a floppy disk serving as an auxiliary storage medium, and a main body 34 which incorporates a CPU and the internal memory.

Thereafter, in the same manner as that described above, a second image signal $SO_2$ is obtained which represents the second radiation image stored on the second stimulable phosphor sheet 47. The second image signal $SO_2$ is stored in the storage means of the image processing and displaying apparatus 30.

Figure 4:
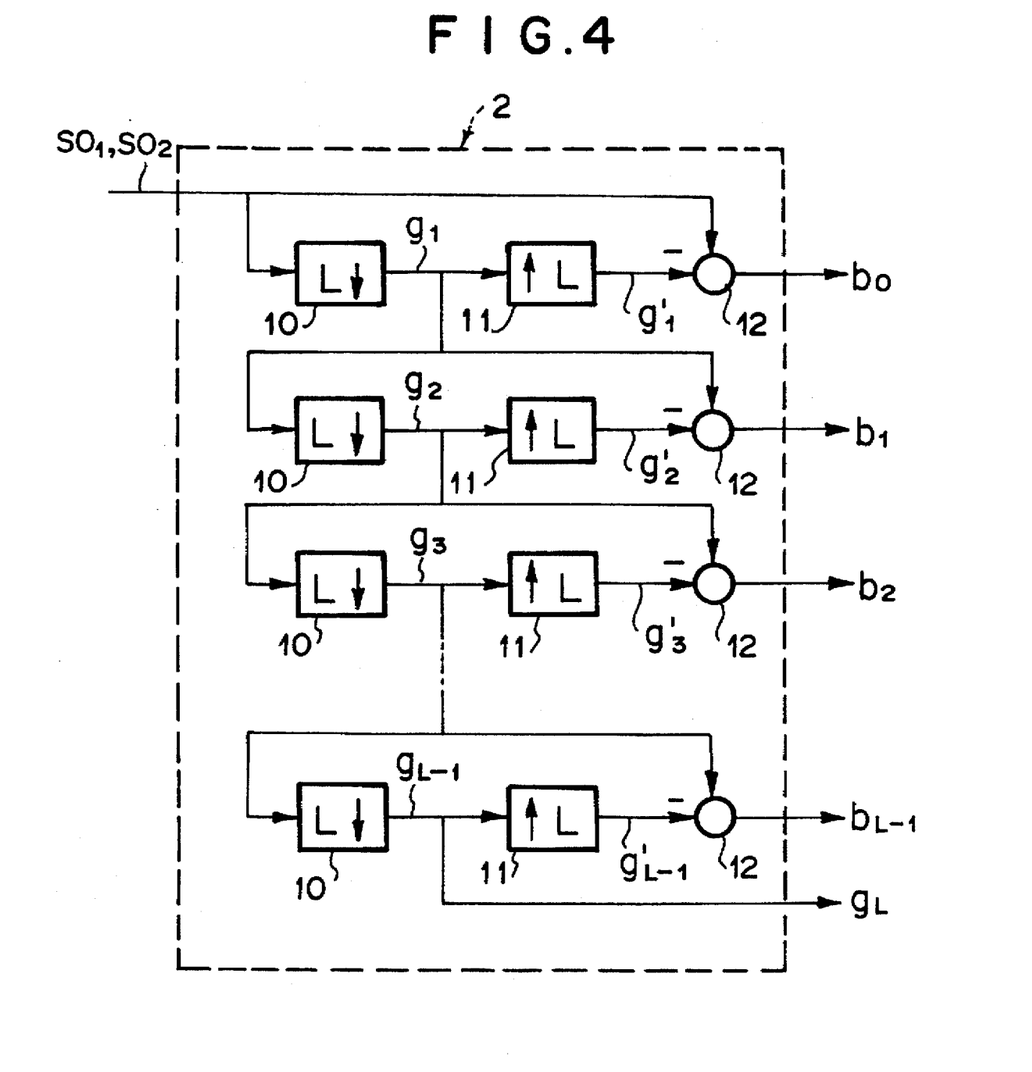
FIG. 4 is a block diagram showing a multi-resolution decomposing process means.
Figure 5:
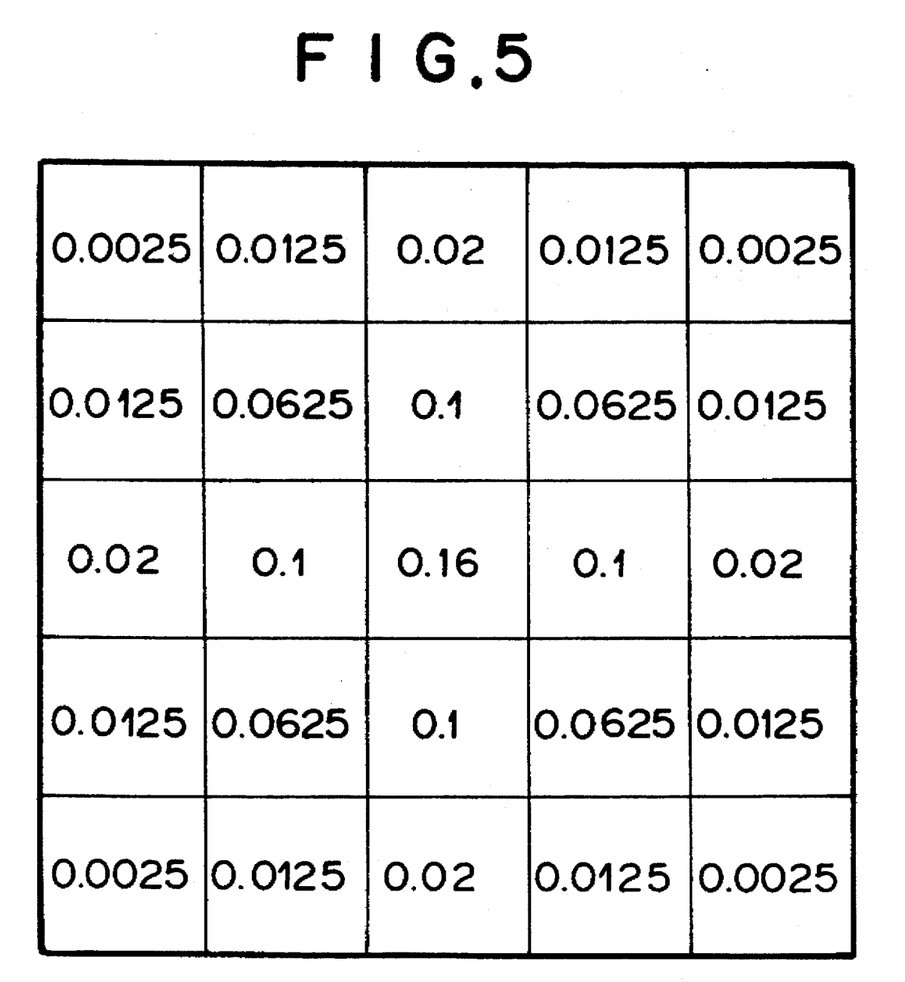
FIG. 5 is an explanatory view showing a low pass filter.

The first image signal $SO_1$ and second image signal $SO_2$ having thus been obtained are fed from the image input means 1 into the multi-resolution decomposing process means 2 shown in FIG. 1. In the multi-resolution decomposing process means 2, processing is carried out on the first image signal $SO_1$ and second image signal $SO_2$ in the manner described below. FIG. 4 is a block diagram showing how the processing is carried out by the multi-resolution decomposing process means 2 shown in FIG. 1. In this embodiment, by way of example, the Laplacian pyramid technique is utilized in order to decompose each of the first image signal $SO_1$ and second image signal $SO_2$ into multi-resolution images. How the first image signal $SO_1$ is decomposed into the multi-resolution images will be described hereinbelow. As illustrated in FIG. 4, the first digital image signal $SO_1$, which represents the original image, is fed into a first filtering means 10 of the multi-resolution decomposing process means 2. In the multi-resolution decomposing process means 2, the first digital image signal $SO_1$ is fed into a first filtering means 10, which carries out a filtering process on the first digital image signal $SO_1$ by using a low pass filter. By way of example, as illustrated in FIG. 5, the low pass filter approximately corresponds to a two-dimensional Gaussian distribution on a 5×5 grid. As will be described later, the same types of low pass filters as that shown in FIG. 5 are utilized for all of the multi-resolution images.

Also, in the filtering means 10, the first image signal $SO_1$, which has been obtained from the filtering process carried out with the low pass filter, is subjected to a sampling process. The filtering means 10 samples the signal components of the first image signal $SO_1$ at every second row and every second column in the array of picture elements of the original image. A low-resolution approximate image signal $gh_1$ is thus obtained from the filtering means 10. The image represented by the low-resolution approximate image signal $gh_1$ has a size of one-fourth of the size of the original image. Thereafter, in a first interpolating operation means 11, a single picture element having a value of 0 is inserted into each of the points on the image represented by the low-resolution approximate image signal $gh_1$, which were eliminated during the sampling process. Specifically, a single picture element having a value of 0 is inserted between every set of two adjacent picture elements located along each row and each column in the array of picture elements of the image represented by the low-resolution approximate image signal $gh_1$. The image represented by the low-resolution approximate image signal $gh_1$, into which the picture elements having a value of 0 have thus been inserted at intervals of a single picture element, is unsharp, and the change in the signal value of the low-resolution approximate image signal $gh_1$ is not smooth due to the picture elements having a value of 0, which have been inserted at intervals of a single picture element.

Further, in the first interpolating operation means 11, the low-resolution approximate image signal representing the image, into which the picture elements having a value of 0 have been inserted in the manner described above, is subjected to a filtering process with the low pass filter shown in FIG. 5. A low-resolution approximate image signal $gh_1'$ is thus obtained from the first interpolating operation means 11. The change in the signal value of the low-resolution approximate image signal $gh_1'$ is smoother than the change in the signal value of the aforesaid low-resolution approximate image signal representing the image, into which the picture elements having a value of 0 have been inserted. Also, the image represented by the low-resolution approximate image signal $gh_1'$ has the characteristics such that the image information of the frequency band higher than the middle frequency in the frequency band of the original image have been eliminated from the original image. This is because, as described above, the size of the image represented by the low-resolution approximate image signal $gh_1$ has been reduced to one-fourth of the size of the original image, the picture elements having a value of 0 have been inserted at intervals of a single picture element into the image represented by the low-resolution approximate image signal $gh_1$, and the filtering process has then been carried out on the resulting low-resolution approximate image signal $gh_1$ by using the low pass filter shown in FIG. 5. As a result, the image is obtained such that the image information of the frequency band higher than the middle frequency in the frequency band of the original image might have been blurred with the Gaussian function.

Figure 6:
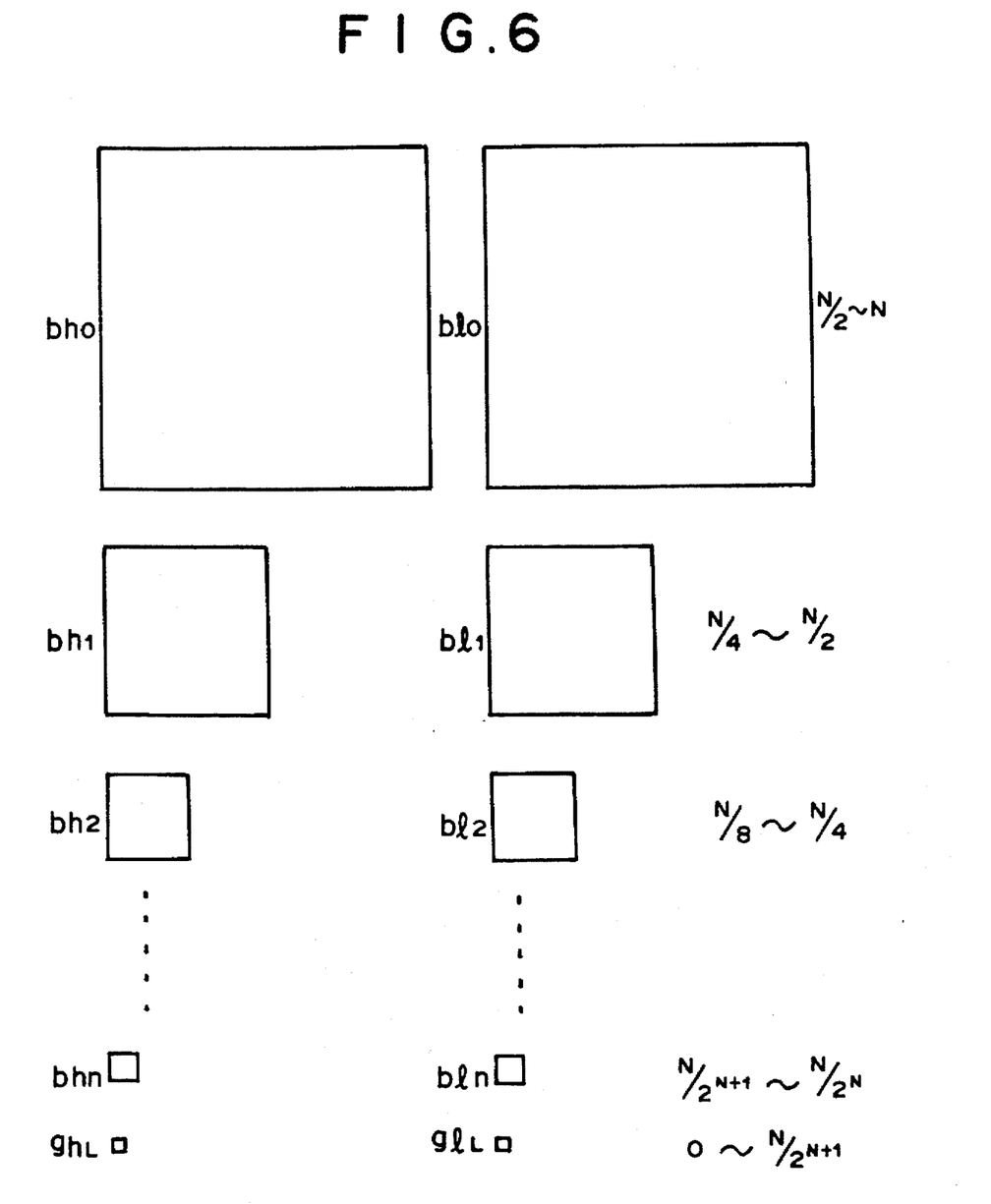
FIG. 6 is an explanatory view showing detail image signals of a plurality of different frequency bands, which are obtained with a Laplacian pyramid technique.

Thereafter, in a first subtracter 12, the low-resolution approximate image signal $gh_1'$ is subtracted from the first image signal $SO_1$ representing the original image, and a detail image signal $bh_0$ is thereby obtained. Specifically, the image signal components of the low-resolution approximate image signal $gh_1'$ and the first image signal $SO_1$ representing the original image, which image signal components represent corresponding picture elements in the two images, are subtracted from each other. As described above, the low-resolution approximate image signal $gh_1'$ has the characteristics such that the image information of the frequency band higher than the middle frequency in the frequency band of the original image might have been blurred. Therefore, the detail image signal $bh_0$ represents only the image information of the frequency band higher than the middle frequency in the frequency band of the original image. Specifically, as illustrated in FIG. 6, the detail image signal $bh_0$ represents the image information of the frequency band of N/2 to N, where N represents the Nyquist frequency of the original image.

Thereafter, the low-resolution approximate image signal $gh_1$ is fed into a second filtering means 10 and subjected to the filtering process using the low pass filter shown in FIG. 5. Also, in the filtering means 10, the low-resolution approximate image signal $gh_1$, which has been obtained from the filtering process, is subjected to a sampling process. The filtering means 10 samples the signal components of the low-resolution approximate image signal $gh_1$ at every second row and every second column in the array of picture elements of the image represented by the low-resolution approximate image signal $gh_1$. A low-resolution approximate image signal $gh_2$ is thus obtained from the filtering means 10. The image represented by the low-resolution approximate image signal $gh_2$ has a size of one-fourth of the size of the image represented by the low-resolution approximate image signal $gh_1$, i.e. a size of one-sixteenth of the size of the original image. Thereafter, in a second interpolating operation means 11, a single picture element having a value of 0 is inserted into each of the points on the image represented by the low-resolution approximate image signal $gh_2$, which were eliminated during the sampling process. Specifically, a single picture element having a value of 0 is inserted between every set of two adjacent picture elements located along each row and each column in the array of picture elements of the image represented by the low-resolution approximate image signal $gh_2$. The image represented by the low-resolution approximate image signal $gh_2$, into which the picture elements having a value of 0 have thus been inserted at intervals of a single picture element, is unsharp, and the change in the signal value of the low-resolution approximate image signal $gh_2$ is not smooth due to the picture elements having a value of 0, which have been inserted at intervals of a single picture element.

Further, in the second interpolating operation means 11, the low-resolution approximate image signal $gh_2$ representing the image, into which the picture elements having a value of 0 have been inserted in the manner described above, is subjected to a filtering process with the low pass filter shown in FIG. 5. A low-resolution approximate image signal $gh_2'$ is thus obtained from the first interpolating operation means 11. The change in the signal value of the low-resolution approximate image signal $gh_2'$ is smoother than the change in the signal value of the aforesaid low-resolution approximate image signal $gh_2$ representing the image, into which the picture elements having a value of 0 have been inserted. Also, the low-resolution approximate image signal $gh_2'$ has the characteristics such that the image information of the frequency components higher than the middle frequency in the frequency band of the low-resolution approximate image signal $gh_1$ has been eliminated from the low-resolution approximate image signal $gh_1$.

Thereafter, in a second subtracter 12, the low-resolution approximate image signal $gh_2'$ is subtracted from the low-resolution approximate image signal $gh_1$, and a detail image signal $bh_1$ is thereby obtained. Specifically, the image signal components of the low-resolution approximate image signal $gh_2'$ and the low-resolution approximate image signal $gh_1$, which image signal components represent corresponding picture elements in the two images, are subtracted from each other. As described above, the low-resolution approximate image signal $gh_2'$ has the characteristics such that the image information of the frequency band higher than the middle frequency in the frequency band of the low-resolution approximate image signal $gh_1$ might have been blurred. Therefore, the detail image signal $bh_1$ represents only the image information of the frequency band higher than the middle frequency in the frequency band of the low-resolution approximate image signal $gh_1$. Specifically, as illustrated in FIG. 6, the detail image signal $bh_1$ represents only the image information of the frequency band higher than the middle frequency in the frequency band of the low-resolution approximate image signal $gh_1$, i.e. the image information of the frequency band of N/4 to N/2, where N represents the Nyquist frequency of the original image. In this manner, the detail image signal is obtained by carrying out the filtering process with the low pass filter having the Gaussian distribution. However, since the image signal having been obtained from the filtering process is subtracted from the low-resolution approximate image signal, substantially the same results as those obtained when the filtering process is carried out with a Laplacian filter can be obtained.

The processing described above is carried out successively for low-resolution approximate image signals ghk, where k=1 to N, which have been respectively filtered and sampled with the corresponding filtering means 10. In this manner, as illustrated in FIG. 6, n number of detail image signals $bh_k$, wherein k=1 to n, and a residual image signal $gh_L$ of the low-resolution approximate image signal are obtained. The levels of the resolution of the detail image signals $bh_k$ successively become lower, starting with the resolution of the detail image signal $bh_0$. Specifically, the frequency bands of the detail image signals $bh_k$ successively become lower. The detail image signals $bh_k$ respectively represent the frequency bands of $N/2^{k+1}$ to $N/2^k$ with respect to the Nyquist frequency N of the original image, and the sizes of the images represented by the detail image signals $bh_k$ become $\frac{1}{2}^{2k}$ times as large as the size of the original image. Specifically, the size of the image represented by the detail image signal $bh_0$, which has the highest resolution, is equal to the size of the original image, and the size of the image represented by the detail image signal $bh_1$, which has a high resolution next to the resolution of the detail image signal $bh_0$, is one-fourth of the size of the original image. The sizes of the images represented by the detail image signals thus successively become smaller, starting with the size equal to the size of the original image. Also, the detail image signals are substantially identical with the image signals obtained from the process using the Laplacian filter. Therefore, the multi-resolution transform in this embodiment is referred to as the Laplacian pyramid. The residual image signal $gh_L$ may be regarded as being an approximate image signal having a very low resolution with respect to the original image. In extreme cases, the residual image signal $gh_L$ is constituted of only a single piece of image information, which represents the mean value of the signal values of the original image. The detail image signals $bh_k$ and the residual image signal $gh_L$, which have thus been obtained, are stored in the storage means 3 shown in FIG. 1.

Also, for the second image signal $SO_2$, the multi-resolution transform processing is carried out with the Laplacian pyramid technique in the same manner as that described above. As illustrated in FIG. 6, detail image signals $bl_k$ and a residual image signal $gl_L$, which are respectively of the same frequency bands as those of the detail image signals $bh_k$ and the residual image signal $gh_L$ obtained from the first image signal $SO_1$, are obtained. The detail image signals blk and the residual image signal $gl_L$ are stored in the storage means 3 shown in FIG. 1.

Thereafter, the detail image signals $bh_k$, $bl_k$ and the residual image signals $gh_L$, $gl_L$ are read from the storage means 3 and fed into the energy subtraction processing means 4. In the energy subtraction processing means 4, the subtraction processing described below is carried out on the detail image signals $bh_k$, $bl_k$ and the residual image signals $gh_L$, $gl_L$. Specifically, weighting and subtracting operations are carried out on the detail image signals $bh_k$, $bl_k$ and on the residual image signals $gh_L$, $gl_L$ with Formula (1).

$$Ssub\ b_k = Kh_k \times bh_k - Kl_k \times bl_k$$

$$Ssubg = Kh_L \times gh_L - Kl_L \times gl_L \qquad (1)$$

wherein $Kh_k$ represents the weight factor for the detail image signal $bh_k$, $Kl_k$ represents the weight factor for the detail image signal $bl_k$, $Kh_L$ represents the weight factor for the residual image signal $gh_L$, and $Kl_L$ represents the weight factor for the residual image signal $gl_L$. From the weighting and subtracting operations, the difference signals Ssub $b_k$ and the difference signal Ssubg, which correspond to the images of the difference between the two radiation images, are obtained for the respective frequency bands.

The weight factors are set as listed in Table 1 shown below. Specifically, as for the high frequency bands, the weight factors $Kh_k$ for the first detail image signals $bh_k$ are set to be equal to 0, and the weight factors $Kl_k$ for the second detail image signals $bl_k$ are set to be equal to −1. Thus the weight factors $Kh_k$ for the first detail image signals $bh_k$ of the high frequency bands are set to be equal to 0 such that the first detail image signals $bh_k$ of the high frequency bands may not be used in the inverse transform, which will be described later. More specifically, in the energy subtraction processing, wherein the difference value between two image signals is calculated, randomly occurring components, such as noise components, in the image become emphasized. Such that the noise components may not be emphasized, the weight factors $Kh_k$ for the first detail image signals $bh_k$ of the high frequency bands are set to be equal to 0. As for the detail image signals $bh_k$ and $bl_k$ of the other frequency bands and as for the residual image signals $gh_L$ and $gl_L$, the subtraction processing is carried out by setting the ratio of the weight factors to be equal to 3:2.

TABLE 1

$Kh_0:Kl_0=0:-1$
$Kh_1:Kl_1=0:-1$
$Kh_2:Kl_2=3:2$
.  .
.  .
.  .
$Kh_n:Kl_n=3:2$
$Kh_L:Kl_L=3:2$

Thereafter, the inverse transform is carried out on the difference signals Ssub $b_k$ and the difference signal Ssubg, which have been obtained in the manner described above. The restoration processing means 5 carries out the inverse transform processing in the manner described below.

Figure 7:
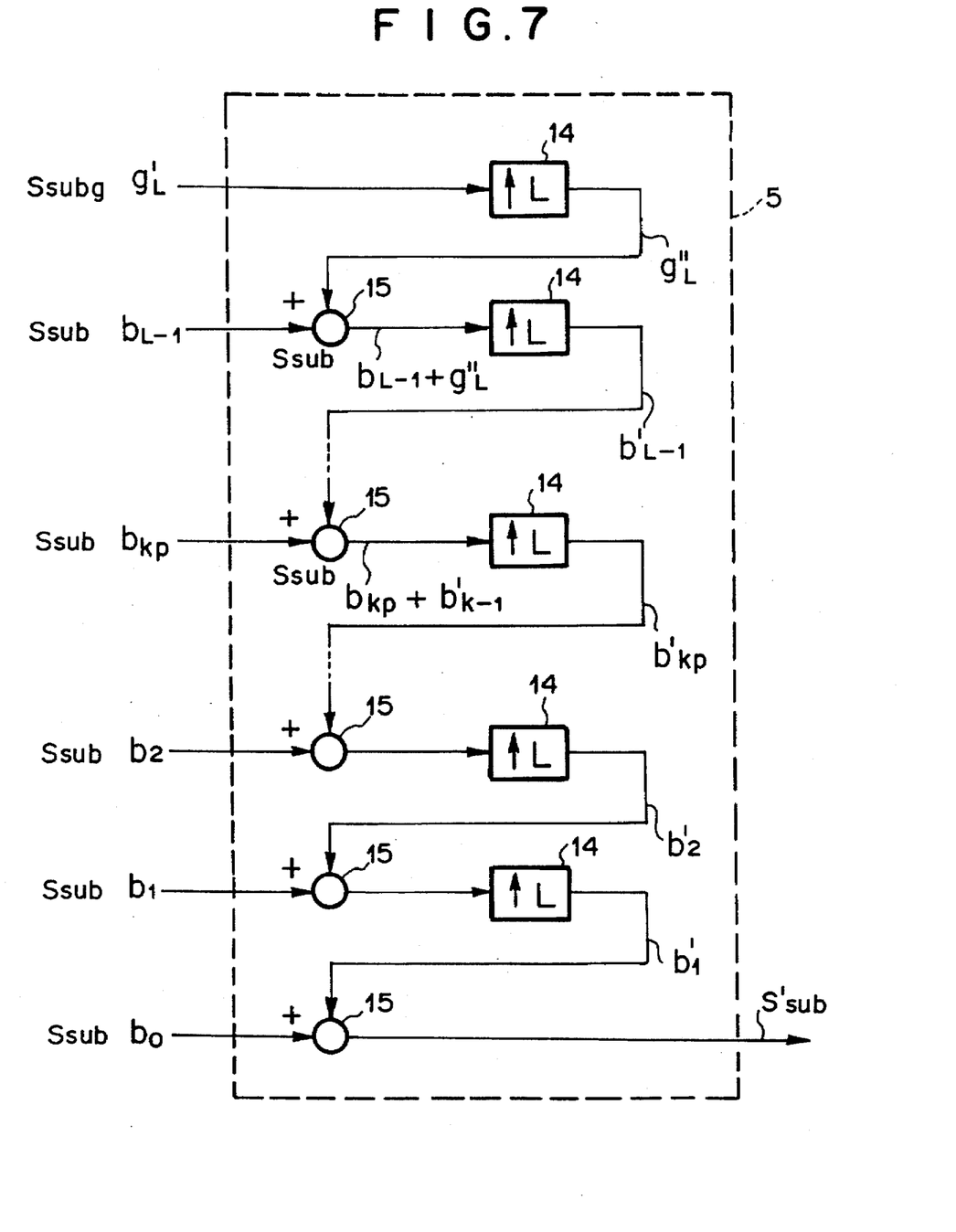
FIG. 7 is a block diagram showing a restoration processing means.

FIG. 7 shows how the inverse transform of the difference signals is carried out. Firstly, the difference signal Ssubg between the residual image signals $gh_L$ and $gh_L$ is fed into a first interpolating operation means 14. In the first interpolating operation means 14, picture elements are inserted between adjacent picture elements of the difference image represented by the difference signal Ssubg, and an image signal $g_L'$ representing an image, which has a size four times as large as the size of the difference image represented by the difference signal Ssubg, is thereby obtained. The image signal $g_L'$ having been obtained from the interpolating operation is then fed into a first adder 15. In the first adder 15, the image signal components of the image signal $g_L'$ and the difference signal Ssub $b_{n-1}$ of the lowest resolution, which image signal components represent corresponding picture elements in the two images, are added to each other. An addition image signal ($g_L'$+Ssub $b_{n-1}$) is thereby obtained. The addition image signal ($g_L'$+Ssub $b_{n-1}$) is then fed into a second interpolating operation means 14. In the second interpolating operation means 14, picture elements are inserted between adjacent picture elements of the image represented by the addition image signal ($g_L'$+Ssub $b_{n-1}$), and an image signal $b_{n-1}'$, which has a size four times as large as the size of the image represented by the addition image signal ($g_L'$+Ssub $b_{n-1}$), is thereby obtained.

Thereafter, the image signal $b_{n-1}'$ is fed into a second adder 15. In the second adder 15, the image signal components of the image signal $b_{n-1}'$ and the difference signal Ssub $b_{n-2}$ of a resolution higher by a single level than the resolution of the difference signal Ssub $b_{n-1}$, which image signal components represent corresponding picture elements in the two images, are added to each other. An addition image signal ($b_{n-1}'$+Ssub $b_{n-2}$) is thereby obtained. The addition image signal ($b_{n-1}'$+Ssub $b_{n-2}$) is then fed into a third interpolating operation means 14. In the third interpolating operation means 14, picture elements are inserted between adjacent picture elements of the image represented by the addition image signal ($b_{n1}'$+Ssub $b_{n-2}$), and an image signal $b_{n-2}'$, which has a size four times as large as the size of the difference signal Ssub $b_{n-2}$, is thereby obtained.

The processing described above is successively carried out for the difference signals of higher frequency bands. Finally, in an adder 15, an interpolation image signal $b_1'$ and a difference signal Ssub $b_0$ having the highest resolution are added to each other, and an energy subtraction signal S'sub is thereby obtained.

The energy subtraction signal S'sub having thus been obtained is fed into the image output means 6 and used in the reproduction of a visible image. The image output means 6 may be constituted of a display means, such as a cathode ray tube (CRT) display means, a recording apparatus for recording an image on photographic film by a light beam scanning operation, or a device for storing an image signal in an image file on an optical disk, a magnetic disk, or the like.

In the manner described above, with the energy subtraction processing method and apparatus in accordance with the present invention, the values of the weight factors for the frequency signals of the plurality of different frequency bands, which signals have been obtained from the transform into the multi-resolution space, are altered in accordance with the frequency bands, and the difference signals are thereby obtained. Therefore, as in the aforesaid embodiment, as for the high frequency bands containing much noise, the values of the weight factors can be set such that noise may not be emphasized. Accordingly, an energy subtraction image, in which noise has been reduced and which has good graininess, can be reproduced as a visible image from the energy subtraction signal S'sub.

Also, the frequency signals of the plurality of different frequency bands are obtained for various kinds of image processing, such as emphasis processing, carried out in the image processing means 7. The frequency signals are stored in the storage means 3. When the energy subtraction processing or the image processing is to be carried out, the frequency signals are read from the storage means 3 and subjected to the energy subtraction processing or the image processing. With the energy subtraction processing method and the apparatus in accordance with the present invention, the frequency signals having previously been stored in the storage means 3 can be utilized. Therefore, particular operations need not necessarily be carried out in order to form new images, the time required to carry out the energy subtraction processing can be kept short, and the processing can be carried out quickly.

Further, in the embodiment described above, the transform of the original image into the multi-resolution images is carried out by utilizing the Laplacian pyramid technique. However, the energy subtraction processing method in accordance with the present invention is not limited to the use of the Laplacian pyramid technique. For example, the transform of the original image into the multi-resolution images may be carried out by utilizing one of other techniques, such as a wavelet transform or a sub-band transform.

The wavelet transform has recently been developed as a frequency analysis method and has heretofore been applied to stereo pattern matching, signal compression, and the like. The wavelet transform is described in, for example, "Wavelets and Signal Processing," by Olivier Rioul and Martin Vetterli, IEEE SP Magazine, pp. 14–38, October 1991; and "Zero-Crossings of a Wavelet Transform," by Stephane Mallat, IEEE Transactions on Information Theory, Vol. 37, No. 4, pp. 1019–1033, July 1991.

With the wavelet transform, a signal is transformed into frequency signals, each being of one of a plurality of different frequency bands, in accordance with the formula $$W(a,b) = \int_{-\infty}^{\infty} f(t) h(a,b) dt \quad (2)$$

wherein f(t): the signal having an arbitrary wave form,
W(a,b): the wavelet transform of f(t), $$h(a,b) = \frac{1}{\sqrt{a}} h(at-b)$$

a: the degree of contraction of the function,
b: the amount of movement in the horizontal axis direction.

Specifically, the filtering process is carried out by changing the period and the degree of contraction of the function h and moving the original signal. In this manner, frequency signals adapted to desired frequencies ranging from a fine frequency to a coarse frequency can be prepared.

The sub-band transform includes the technique for obtaining the images of two frequency bands by utilizing a single kind of filter as in the wavelet transform, and the technique for obtaining the images of a plurality of frequency bands with a single simultaneous operation by utilizing a plurality of kinds of filters.

Also, after the images of plurality of different frequency bands are obtained from the wavelet transform or the sub-band transform, the energy subtraction processing may be carried out by altering the weight factors for the frequency signals of the respective frequency bands in the same manner as that described above for the Laplacian pyramid technique. In this manner, the energy subtraction processing can be carried out such that the unnecessary frequency components, such as noise components, may not be emphasized. Therefore, an energy subtraction image can be obtained, in which noise is imperceptible and which has good image quality and can serve as an effective tool in, particularly, the efficient and accurate diagnosis of an illness.

What is claimed is:

1. An energy subtraction processing method, comprising the steps of:

i) obtaining frequency signals, each of which is of one of a plurality of different frequency bands and which have been obtained by transforming each of a plurality of image signals into a multi-resolution space, each of the plurality of the image signals representing one of a plurality of radiation images of a single object and being made up of a series of image signal components, the plurality of the radiation images of the single object having been formed respectively with a plurality of kinds of radiation having different energy distributions, different images of at least part of the object being embedded in the plurality of the radiation images, ii) weighting the signal components of the frequency signals, which are of an identical frequency band and correspond to different image signals among the plurality of the image signals, with weight factors, which are set in accordance with the frequency band, said signal components of said frequency signals representing corresponding picture elements in frequency images represented by said frequency signals, iii) subtracting the weighted signal components of said frequency signals from one another, which signal components represent corresponding picture elements in said frequency images represented by said frequency signals, a difference signal being thereby obtained for said identical frequency band, iv) carrying out said weighting and subtracting operations for each of the plurality of the different frequency bands, a plurality of difference signals being thereby obtained, and v) carrying out an inverse transform on said difference signals having been obtained for the plurality of the different frequency bands, an energy subtraction signal being thereby obtained.

2. A method as defined in claim 1 wherein said transform of each of the plurality of the image signals into the multi-resolution space is carried out with a technique selected from the group consisting of a Laplacian pyramid technique, a wavelet transform, and a sub-band transform.

3. A method as defined in claim 1 wherein each of the plurality of the radiation images has been stored on a stimulable phosphor sheet.

4. A method as defined in claim 3 wherein each of the plurality of the image signals representing the plurality of the radiation images is obtained by exposing each stimulable phosphor sheet to stimulating rays, which cause the stimulable phosphor sheet to emit light in proportion to the amount of energy stored thereon during its exposure to the radiation, and photoelectrically detecting the emitted light.

5. A method as defined in claim 1 wherein each of the plurality of the radiation images has been recorded on photographic film.

6. An energy subtraction processing apparatus, comprising:

i) a storage means for storing frequency signals, each of which is of one of a plurality of different frequency bands and which have been obtained by transforming each of a plurality of image signals into a multi-resolution space, each of the plurality of the image signals representing one of a plurality of radiation images of a single object and being made up of a series of image signal components, the plurality of the radiation images of the single object having been formed respectively with a plurality of kinds of radiation having different energy distributions, different images of at least part of the object being embedded in the plurality of the radiation images, ii) a subtraction processing means for weighting the signal components of the frequency signals, which are of an identical frequency band and correspond to different image signals among the plurality of the image signals, with weight factors, which are set in accordance with the frequency band, said signal components of said frequency signals representing corresponding picture elements in frequency images represented by said frequency signals, said subtraction processing means subtracting the weighted signal components of said frequency signals from one another, which signal components represent corresponding picture elements in said frequency images represented by said frequency signals, a difference signal being thereby obtained for said identical frequency band, said subtraction processing means carrying out said weighting and subtracting operations for each of the plurality of the different frequency bands, a plurality of difference signals being thereby obtained, and iii) an inverse transform means for carrying out an inverse transform on said difference signals having been obtained for the plurality of the different frequency bands, an energy subtraction signal being thereby obtained.

7. An apparatus as defined in claim 6 wherein said transform of each of the plurality of the image signals into the multi-resolution space is carried out with a technique selected from the group consisting of a Laplacian pyramid technique, a wavelet transform, and a sub-band transform.

8. An apparatus as defined in claim 6 wherein each of the plurality of the radiation images has been stored on a stimulable phosphor sheet.

9. An apparatus as defined in claim 8 wherein each of the plurality of the image signals representing the plurality of the radiation images is obtained by exposing each stimulable phosphor sheet to stimulating rays, which cause the stimulable phosphor sheet to emit light in proportion to the amount of energy stored thereon during its exposure to the radiation, and photoelectrically detecting the emitted light.

10. An apparatus as defined in claim 6 wherein each of the plurality of the radiation images has been recorded on photographic film.

* * * * *